(12) United States Patent
Fukami et al.

(10) Patent No.: US 10,706,996 B2
(45) Date of Patent: Jul. 7, 2020

(54) MAGNETIC MATERIAL AND METHOD OF MANUFACTURING THE SAME

(71) Applicant: TOHOKU UNIVERSITY, Sendai-shi, Miyagi (JP)

(72) Inventors: Shunsuke Fukami, Miyagi (JP); Hideo Sato, Miyagi (JP); Michihiko Yamanouchi, Miyagi (JP); Shoji Ikeda, Miyagi (JP); Hideo Ohno, Miyagi (JP)

(73) Assignee: TOHOKU UNIVERSITY, Sendai-Shi, Miyagi (JP)

( * ) Notice: Subject to any disclaimer, the term of this patent is extended or adjusted under 35 U.S.C. 154(b) by 300 days.

(21) Appl. No.: 14/647,281

(22) PCT Filed: Nov. 11, 2013

(86) PCT No.: PCT/JP2013/080963
§ 371 (c)(1),
(2) Date: May 26, 2015

(87) PCT Pub. No.: WO2014/091874
PCT Pub. Date: Jun. 19, 2014

(65) Prior Publication Data
US 2015/0332818 A1    Nov. 19, 2015

(30) Foreign Application Priority Data
Dec. 14, 2012    (JP) .................. 2012-273044

(51) Int. Cl.
*H01F 1/04* (2006.01)
*H01F 1/047* (2006.01)
(Continued)

(52) U.S. Cl.
CPC ............ *H01F 1/047* (2013.01); *B32B 15/01* (2013.01); *H01F 1/04* (2013.01); *H01F 7/02* (2013.01);
(Continued)

(58) Field of Classification Search
CPC ......... B32B 15/01; H01F 10/14; H01F 10/16; H01F 10/265; H01F 1/04; H01F 1/047; H01F 41/14; H01F 7/02; Y10T 428/12944
See application file for complete search history.

(56) References Cited

U.S. PATENT DOCUMENTS 8,920,947 B2    12/2014    Zhang
2009/0246557 A1    10/2009    Horng et al.
(Continued)

FOREIGN PATENT DOCUMENTS

JP    02-23678    1/1990
JP    05-315135    11/1993
(Continued)

OTHER PUBLICATIONS

Yakushiji et al. "Perpendicular-MgO-MTJs with fcc(111)-oriented CoPt superlattices." Extended Abstracts of the 2009 International Conference on Solid State Devices and Materials (2009): 1388-1389.*
(Continued)

Primary Examiner — Holly C Rickman
Assistant Examiner — Lisa Chau
(74) Attorney, Agent, or Firm — Rabin & Berdo, P.C.

(57) ABSTRACT

A magnetic material includes a structure in which a first magnetic layer 1 and a second magnetic layer 2 are stacked such that each layer is formed at least partially in a stacking direction by substantially one atomic layer. The first magnetic layer contains Co as a principal component. The second magnetic layer includes at least Ni. The magnetic material has magnetic anisotropy in the stacking direction. Preferably, an atomic arrangement within a film surface of the first magnetic layer and the second magnetic layer has six-fold symmetry.

21 Claims, 6 Drawing Sheets

(51) Int. Cl.
*B32B 15/01* (2006.01)
*H01F 41/14* (2006.01)
*H01F 10/14* (2006.01)
*H01F 7/02* (2006.01)
*H01F 10/26* (2006.01)
*H01F 10/16* (2006.01)

(52) U.S. Cl.
CPC .......... *H01F 10/265* (2013.01); *H01F 41/14* (2013.01); *H01F 10/14* (2013.01); *H01F 10/16* (2013.01); *Y10T 428/12944* (2015.01)

(56) References Cited

U.S. PATENT DOCUMENTS

| | | | | |
|---|---|---|---|---|
| 2009/0257151 | A1* | 10/2009 | Zhang | G01R 33/098 360/324.2 |
| 2011/0293967 | A1 | 12/2011 | Zhang | |
| 2012/0040207 | A1 | 2/2012 | Horng et al. | |
| 2012/0058575 | A1 | 3/2012 | Horng et al. | |
| 2012/0135275 | A1 | 5/2012 | Kariyada et al. | |

FOREIGN PATENT DOCUMENTS

| | | |
|---|---|---|
| JP | 2011-003869 | 1/2011 |
| JP | 2011249812 A | 12/2011 |
| JP | 2012-178541 | 9/2012 |

OTHER PUBLICATIONS

Gottwald et al. "Co/Ni(111) superlattices studied by microscopy, x-ray absorption, and ab initio calculations." Physical Review B, vol. 86, No. 1, 2012 (014425-1-014425-15).*
International Search Report, PCT/JP2013/080963, dated Feb. 18, 2014.
S. Iwata et al., Perpendicular Magnetic Anisotropy and Magneto-Optical Kerr Spectra of MBE-Grown PtCo Alloy Films IEEE Transactions on Magnetics, vol. 33, No. 5, Sep. 1997, p. 3670.
K. Yakushiji, et al., "Ultrathin Co/Pt and Co/Pd Superlattice Films for MgO-based Perpendicular Magnetic Tunnel Junctions", Applied Physics Letters, vol. 97, p. 232508 (2010).
G.H.O Daalderop, P.J. Kelly, and F.J.A. den Broeder, Prediction and Confirmation of Perpendicular Magnetic Anisotoropy in Co/Ni Multilayers, Physical Review Letters, vol. 68, No. 5, Feb. 3, 1992, p. 682-685.
Masaki Mizuguchi, Takayuki Kojima, Koki Takanashi, "Fabrication of L1_0-type FeNi Thin Films by Alternative Monatomic Deposition and their Magnetic Anisotropy", Abstracts of the Meeting of the Physical Society of Japan, Aug. 24, 2011 (Aug. 24, 2011), 66 (2-4), p. 919.
Japanese Office Action dated Aug. 2, 2017; Application No. 2014-551944.
Masaki Mizuguchi, et al., "Fabrication of L10 type FeNi thin films by alternative monatomic deposition and their magnetic anisotropy", Meeting Abstracts of the Physical Society of Japan, Japan, Aug. 24, 2011, 66(2-4), p. 919.

* cited by examiner

MAGNETIC MATERIAL AND METHOD OF MANUFACTURING THE SAME

TECHNICAL FIELD

The present invention relates to a magnetic material and a method of manufacturing the same.

BACKGROUND ART

Magnetic materials are roughly classified into hard magnetic materials and soft magnetic materials. Hard magnetic materials are used for permanent magnets, digital devices, and the like.

Physical characteristics of hard magnetic materials include high magnetically anisotropic energy. Typical examples of hard magnetic materials include Nd—Fe—B, Nd—Dy—Fe—B, Sm—Co, Fe—Pt, Fe—Pd, Co—Pt, Tb—Fe—Co, Gd—Fe—Co, Co—Cr—Pt (each of which is an alloy material), Co/Pt, Co/Pd, Fe/Au (each of which is a nano-laminate material), and the like.

Typical examples of applications of permanent magnets include motors. There are various types of motors. For example, a permanent magnet formed of a hard magnetic material is used for a rotor that rotates within a space in which the polarity of a magnetic field varies with time.

A typical example of digital devices using a hard magnetic material is a hard disk drive. A hard disk drive includes a medium to store information by using the direction of the magnetization of a magnetic material and a head for storing information to the medium and reading information from the medium. The medium employs a hard magnetic material to hold information stored therein. In recent years, not only hard disk drives, but also magnetic random access memories have been studied actively as digital devices using a magnetic material. Some magnetic random access memories have been put into practice.

With regard to media of hard disk drives and storage elements of magnetic random access memories, recent development subjects have been shifted from in-plane magnetically anisotropic materials having an easy axis of magnetization within a plane of a substrate to perpendicular magnetically anisotropic materials having an easy axis of magnetization in a direction perpendicular to a substrate. This is because a perpendicular magnetically anisotropic material generally facilitates performance enhancement.

The structure of a magnetic random access memory will be described in greater detail below. A magnetic random access memory generally has a magnetic tunnel junction in which a magnetic layer, a non-magnetic layer, and a magnetic layer are stacked. One of the two magnetic layers has a variable direction of magnetization. Thus, the direction of magnetization varies when a magnetic field or an electric current is applied to the magnetic layer. The direction of magnetization of the other magnetic layer is perpetually fixed. As a matter of course, a hard magnetic material having relatively high magnetic anisotropy is required for the latter magnetic layer. For the former magnetic layer, a hard magnetic material having relatively high magnetic anisotropy is also required in order to hold information with stability. From the practical aspect, it is desirable to use a reactive ion etching method for patterning magnetic tunnel junctions in view of reduction in size, increase in capacity, reduction in cost, and the like.

PRIOR ART LITERATURES

Non-Patent Literatures

Non-Patent Literature 1: G. H. O. Daalderop, P. J. Kelly, and F. J. A. den Broeder: Physical Review Letters, vol. 68, no. 5, p. 682 (1992).

Non-Patent Literature 2: S. Iwata, S. Yamashita, and S. Tsunashima: IEEE Transactions on Magnetics, vol. 33, no. 5, p. 3670 (1997).

Non-Patent Literature 3: K. Yakushiji, T. Saruya, H. Kubota. A. Fukushima, T. Nagahama, S. Yuasa, and K. Ando: Applied Physics Letters, vol. 97, p. 232508 (2010).

SUMMARY OF INVENTION

Problem(s) to be Solved by Invention

A first object of the present invention is improvement in facilitation of manufacturing a magnetic device using a hard magnetic material as described above. The facilitation of manufacturing refers to easiness of synthesis, easiness of processing, and easiness of maintaining material characteristics.

For example, the aforementioned hard magnetic material using Fe—Pt alloy, Fe—Pd alloy, Co—Pt alloy, Sm—Co alloy, or the like requires a high substrate temperature and a high heat treatment temperature in order to have high perpendicular magnetic anisotropy. However, a magnetic device using a hard magnetic material is usually mounted on a substrate with other devices. In this case, other devices mounted with the magnetic device and the substrate have an upper limit of heat resistance. Thus, a high process temperature hinders implementation of magnetic devices. From this point of view, it is preferable to be capable of forming a hard magnetic material by a process under an environment having a relatively low temperature (for example, 300° C.).

Furthermore, a hard magnetic material using a noble metal such as Pt, Pd, or Au generally has low chemical reactivity. Therefore, when such a hard magnetic material is processed by a reactive ion etching method, the material is reattached to sidewalls of the device. Such reattachment may cause defects in electric characteristics, also cause attachment to an inner wall of the process apparatus so that conditions of the apparatus are deteriorated, and cause generation of particles. From this point of view, a hard magnetic material needs to have somewhat high chemical reactivity so that it can readily be patterned by a reactive ion etching method.

For example, a hard magnetic material of Tb—Fe—Co or Gd—Fe—Co readily corrodes when it is contaminated by moisture or the like. Additionally, the original amorphous structure of such a hard magnetic material is crystallized when it is heated at about 300° C. so that the characteristics of the material are changed. From this point of view, a hard magnetic material needs to have sufficiently high corrosion resistance and heat resistance in practice such that the material characteristics can readily be maintained.

A second object of the present invention is reduction in raw material cost and continuous supply of a raw material. First, noble metals such as Pt, Pd, or Au are expensive. Furthermore, the market prices of rare-earth metals such as Nd, Dy, Sm, Tb, or Gd are also as high as noble metals because it is difficult to refine rare-earth metals. Furthermore, noble metals and rare-earth metals have small reserves in the earth. Therefore, it is not guaranteed that noble metals and rare-earth metals are stably supplied for a long period of time. Accordingly, the content of noble metals and rare-earth metals in a magnetic material for a magnetic device needs to be reduced as much as possible, and thus a magnetic material that can achieve hard magnetic characteristics with only a transition metal, which is inexpensive, is desired.

Means for Solving the Problems(s)

A magnetic material according to the present invention includes a structure in which a first magnetic layer and a second magnetic layer are stacked such that each layer is formed at least partially in a stacking direction by one atomic layer. The first magnetic layer contains Co as a principal component. The second magnetic layer includes at least Ni. The magnetic material has magnetic anisotropy in the stacking direction. Preferably, an atomic arrangement within a film surface of the first magnetic layer and the second magnetic layer has six-fold symmetry.

Furthermore, the first magnetic layer and the second magnetic layer of the magnetic material are formed by deposition with one of a sputtering method, a vacuum deposition method, a molecular beam epitaxy method, a laser ablation method, and an ion plating method, and the like. Additionally, the magnetic material may be formed by cold rolling or the like.

Advantageous Effects of the Invention

A first advantageous effect of the present invention is facilitation of manufacturing a hard magnetic material having high magnetic anisotropy. Known hard magnetic materials require a high-temperature process for synthesis. The high-temperature process exerts an adverse influence. Furthermore, it is difficult to process those known hard magnetic materials by a reactive ion etching method. In contrast, a magnetic material according to the present invention can be formed at a room temperature. Thus, a magnetic material according to the present invention requires no high-temperature process. Furthermore, a magnetic material according to the present invention can maintain characteristics after heat treatment at a high temperature. Moreover, a magnetic material according to the present invention includes a transition metal such as Co or Ni, which has relatively high reactivity, as a principal component. Therefore, it is easy to process a magnetic material according to the present invention by a reactive ion etching method.

A second advantageous effect of the present invention is reduction in raw material cost for manufacturing a hard magnetic material having high magnetic anisotropy, continuous supply of raw materials, and the like. A magnetic material according to the present invention includes a transition metal such as Co or Ni as a principal component. Such a transition metal is available at a lower cost as compared to noble metals such as Pt, Pd, and Au and rare-earth metals such as Sm, Nd, Dy, Tb, and Gd. Furthermore, such a transition metal has overwhelmingly large reserves in the earth. Accordingly, such a transition metal can continuously be supplied over the future.

MODE(S) FOR CARRYING OUT THE INVENTION

Embodiments of a magnetic material according to the present invention and a method of manufacturing such a magnetic material will be described below with reference to the accompanying drawings.

[Structure]

Figure 1:
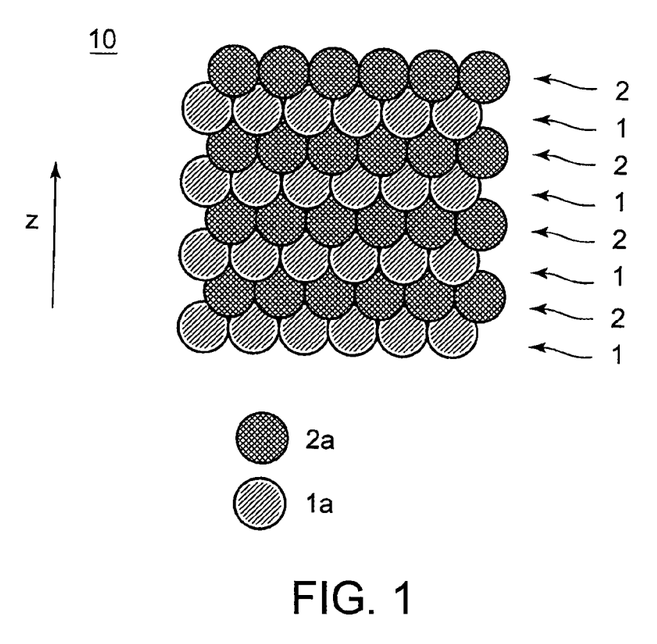
FIG. 1 is a cross-sectional view schematically showing a primary structure of a magnetic material according to the present invention.
Figure 2:
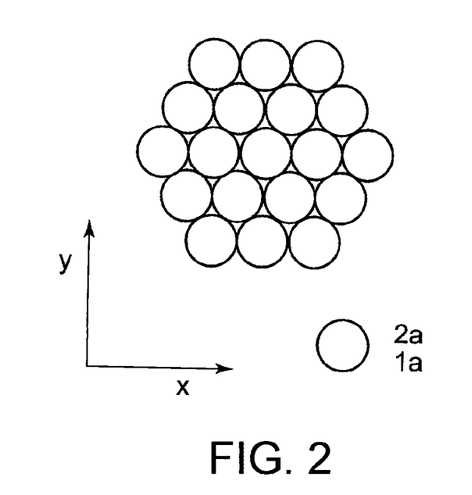
FIG. 2 is a plan view schematically showing a primary structure of a magnetic material according to the present invention.

FIGS. 1 and 2 schematically show a primary structure of a magnetic material according to an embodiment of the present invention. FIG. 1 is a cross-sectional view, and FIG. 2 is a plan view.

A magnetic material 10 according to the embodiment of the present invention has a structure in which first magnetic layers 1 and second magnetic layers 2 are alternately stacked such that each layer is formed by substantially one atomic layer. In FIGS. 1 and 2, the z-axis is parallel to a stacking direction of this layered body. The x-axis and the y-axis are on a plane of one magnetic layer. The first magnetic layers 1 include Co atoms 1a as a principal component. The second magnetic layers 2 include at least Ni atoms 2a. As shown in FIG. 2, each of the first magnetic layers 1 and the second magnetic layers 2 preferably has an atomic arrangement of substantially six-fold symmetry in the film surface. The crystallographic axis within the x-y plane may differ from one crystal grain to another. The layer can have substantially six-fold symmetry within one crystal grain. When the magnetic material 10 has such an arrangement, high magnetic anisotropy is produced in the z-axis direction. In other words, perpendicular magnetic anisotropy is produced in the stacking direction. This is a suitable direction of the magnetic anisotropy when the magnetic material 10 is applied to a medium of a hard disk drive or a magnetic random access memory.

Here, the term "substantially one atomic layer" is used because the present invention can be implemented when each layer is not exactly one atomic layer. This will be clarified in the subsequent explanation of some variations. This also holds true for "substantially six-fold symmetry."

A typical example of the magnetic material 10 has a structure in which the first magnetic layers 1 are formed of Co, the second magnetic layers 2 are formed of Ni, and Co and Ni are alternately stacked such that each layer is formed by substantially one atomic layer.

Preferably, the film thickness of the first magnetic layer 1 and the second magnetic layer 2 should be close to the thickness of one atomic layer. In practice, desired characteristics can be obtained when the film thickness of the first magnetic layer 1 and the second magnetic layer 2 is in a range of 0.10 nm to 0.35 nm. More preferably, the film thickness of the first magnetic layer 1 and the second magnetic layer 2 is designed to be in a range of 0.15 nm to 0.30 nm.

Non-Patent Literature 1 has reported that high magnetic anisotropy is produced in the stacking direction of a layered film of Co and Ni. Non-Patent Literature 1 describes that a maximum magnetic anisotropy is obtained according to the first-principles calculation when a ratio of the film thickness of Co and Ni is 1:2. Non-Patent Literature 1 describes that this results from the interface magnetic anisotropy of Co and Ni.

Meanwhile, the inventors have found from experiments that higher magnetic anisotropy is obtained when a ratio of the film thickness of Co and Ni is 1:1. This suggests that some factor that has not been considered by the first-principles calculation of Non-Patent Literature 1 causes high magnetic anisotropy in a structure in which Co and Ni are alternately stacked such that each layer is formed by substantially one atomic layer and that such a factor results from a crystal structure, not from a stacked structure. According to Non-Patent Literature 1, a maximum magnetic anisotropy is obtained with a layered film of Co and Pd when a ratio of the film thickness of Co and Pd is about 1:2. However, Non-Patent Literatures 2 and 3 have reported that high magnetic anisotropy can be obtained in a structure in which Co and Pt or Co and Pd are alternately stacked while Co and Pt or Co and Pd have six-fold symmetry on the deposited surface. Non-Patent Literature 2 describes that this results from an ordered structure of Co and Pt (NiAs type or CuPt(L1$_1$)type). It is conceivable that the magnetic material 10 according to the present invention has a development mechanism of the magnetic anisotropy that results from an ordered structure as described in Non-Patent Literatures 2 and 3 and that high magnetic anisotropy is thus obtained with a configuration that has not heretofore been known in a layered film of Co and Ni. Accordingly, in the magnetic material 10 according to the present invention, a layered body in which the first magnetic layers 1 and the second magnetic layers 2 are alternately stacked should preferably have a crystal structure of either NiAs type or CuPt type (L1$_1$ type).

Example

Figure 3A:
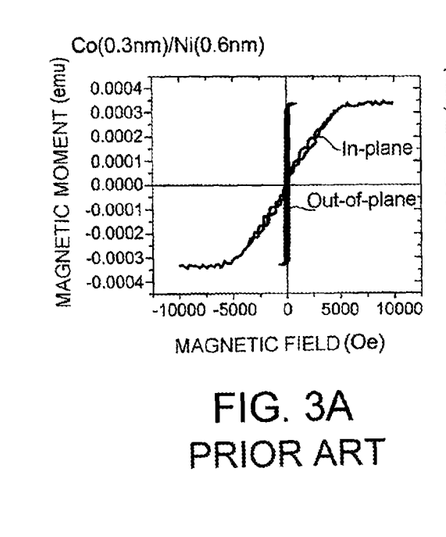
FIG. 3A is a graph showing measurement results of magnetization curves of a known magnetic material.
Figure 3B:
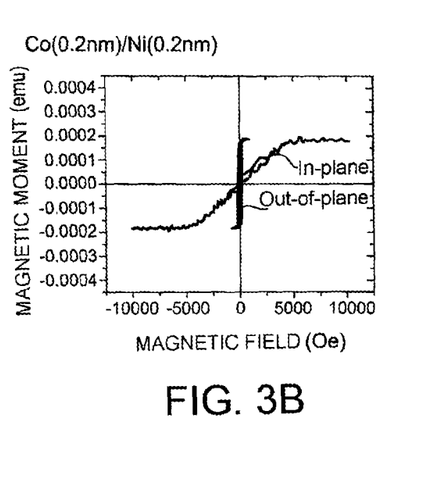
FIG. 3B is a graph showing measurement results of magnetization curves of a magnetic material according to the present invention.

Next, an example of the present invention will be described with reference to measurement results. FIG. 3A shows magnetization curves of a layered film (magnetic material) in which Co and Ni were stacked while a ratio of the film thickness of Co and Ni was 1:2 as disclosed in Non-Patent Literature 1. FIG. 3B shows magnetization curves of a layered film (magnetic material) according to an example of the present invention in which Co and Ni were alternately stacked such that each layer was formed by substantially one atomic layer. FIGS. 3A and 3B show magnetization curves in a direction perpendicular to the substrate (out-of-plane) and in a direction on a plane of the substrate (in-plane) within the magnetic material. Specific film configurations were Si substrate/Ta (3 nm)/Pt (2.4 nm)/[Co (0.3 nm)/Ni (0.6 nm)]$_4$/Co (0.3)/Pt (1.5 nm)/Ta (3 nm), and Si substrate/Ta (3 nm)/Pt (2.4 nm)/[Co (0.2 nm)/Ni (0.2 nm)]$_4$/Co (02)/Pt (1.5 nm)/Ta (3 nm). Those magnetic materials were produced by a DC magnetron sputtering method. The temperature of the substrate upon deposition was the room temperature. No heat treatment was performed after the deposition. FIG. 1 omits an underlayer and a cap layer other than the Co/Ni layered structure of the aforementioned specific film configuration from the illustration. Si substrates covered with a native oxide film were used. The size of samples measured for the magnetization curves was 10 mm×10 mm. In either case, it is seen that the direction perpendicular to the substrate was along the easy axis of magnetization. The saturation magnetization and the magnetically anisotropic energy constant of the samples were calculated from analysis of the magnetization curves as 850 emu/cc and 7.0×10$^6$ erg/cc for Co (0.3 nm)/Ni (0.6 nm), and 1000 emu/cc and 8.8×10$^6$ erg/cc for Co (0.2 nm)/Ni (0.2 nm). It is seen that higher magnetic anisotropy was obtained with Co (0.2 nm)/Ni (0.2 nm), which is one form of the magnetic material 10 according to an example of the present invention, as compared to a configuration as illustrated in Non-Patent Literature 1 in which a ratio of the film thickness of Co and Ni is 1:2 (Co (0.3 nm)/Ni (0.6 nm)).

Figure 4:
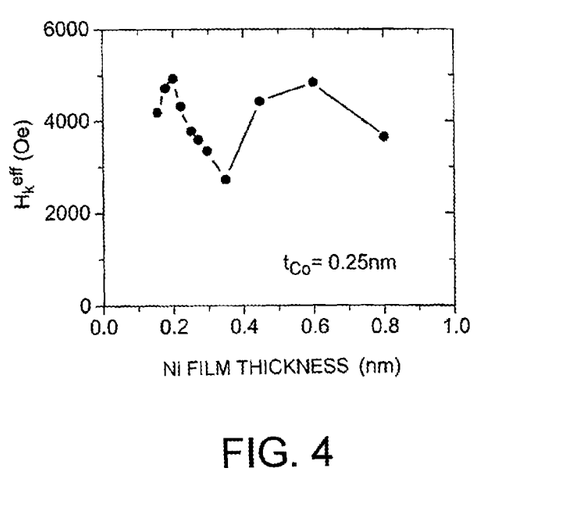
FIG. 4 is a graph explanatory of Ni film thickness dependency of an effective anisotropic magnetic field of a magnetic material according to the present invention.

FIG. 4 shows variations of an effective anisotropic magnetic field H$_k^{eff}$(Oe) when the film thickness of Ni was varied while the film thickness t$_{Co}$, of Co was fixed at 0.25 nm. A peak that accords with the suggestion of Non-Patent Literature 1 based upon the first-principles calculation is found around a point where a ratio of the film thickness of Co and Ni is about 1:2. Another peak is also found around a point where a ratio of the film thickness of Co and Ni is about 1:1. This peak has not heretofore been known to exist. As the film thickness of Ni is smaller, the magnitude of the saturation magnetization increases. As a result, if the magnitude of the effective anisotropic magnetic field is the same, a sample having a larger saturation magnetization and a smaller film thickness of Ni has higher magnetic anisotropy. That is, the left peak in FIG. 4 has higher magnetic anisotropy.

Variations

Next, variations of the structure of the magnetic material 10 according to the present invention will be described with reference to FIGS. 5 to 9.

Figure 5:
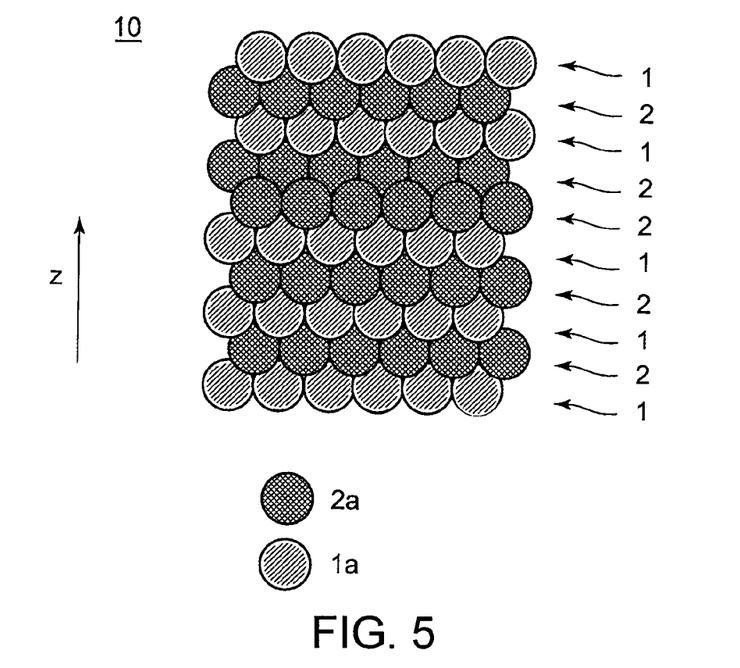
FIG. 5 is a cross-sectional view schematically showing a first variation of the primary structure of the magnetic material according to the present invention.

FIG. 5 schematically illustrates a first variation of a primary structure of the magnetic material 10 according to the present invention. In FIG. 5, the first magnetic layers 1 and the second magnetic layers 2 are stacked such that each layer is generally formed by one atomic layer. In the middle of the stacking, however, two atomic layers of the second magnetic layers 2 are sequentially stacked. In other words, the stacking structure includes a first magnetic layer 1, a second magnetic layer 2, a first magnetic layer 1, a second magnetic layer 2, a first magnetic layer 1, a second magnetic layer 2, a second magnetic layer 2, a first magnetic layer 1, a second magnetic layer 2, and a first magnetic layer 1 stacked in the order from the bottom. Even if the periodic structure has such a defect, high magnetic anisotropy to be expected according to the present invention is demonstrated in a non-defective region. Thus, the present invention can be implemented. Specifically, the first variation and second to fifth variations illustrated in FIGS. 6 to 9 can be expressed to have a structure in which first magnetic layers 1 containing Co atoms 1a as a principal component and second magnetic layers 2 including at least Ni atoms 2a are alternately stacked such that each layer is formed by substantially one atomic layer.

Figure 6:
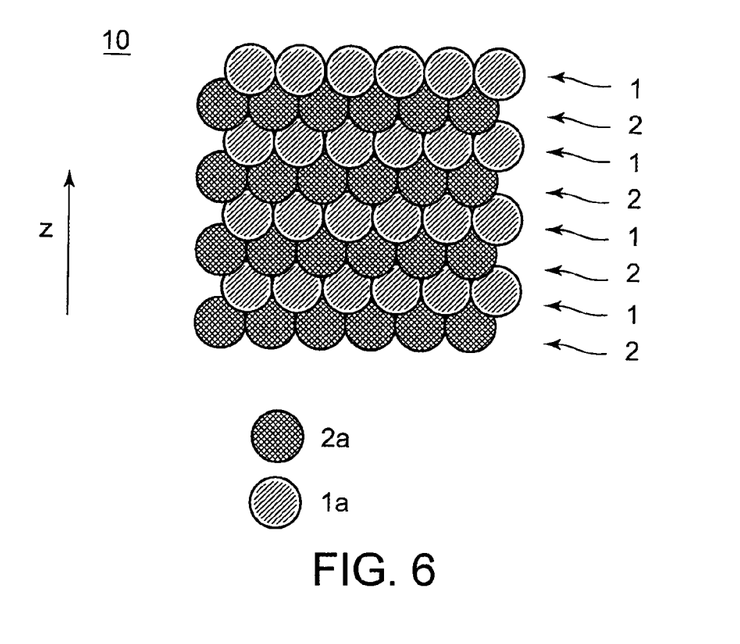
FIG. 6 is a cross-sectional view schematically showing a second variation of the primary structure of the magnetic material according to the present invention.

FIG. 6 schematically illustrates a second variation of a primary structure of the magnetic material 10 according to the present invention. In FIG. 1, the first magnetic layers 1 and the second magnetic layers 2 are stacked in the order named from the bottom. This order may be reversed as shown in FIG. 6. Specifically, the second magnetic layers and the first magnetic layers may be stacked in the order named from the bottom. Thus, the magnetic material 10 according to the present invention may have a structure in which the first magnetic layers 1 and the second magnetic layers 2 are alternately stacked at least partially in the stacking direction such that each layer is formed by one atomic layer.

Figure 7:
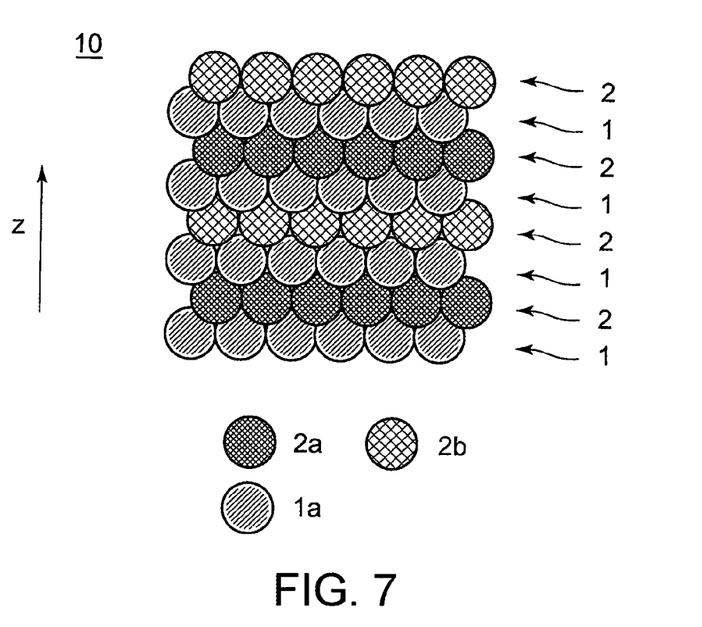
FIG. 7 is a cross-sectional view schematically showing a third variation of the primary structure of the magnetic material according to the present invention.

FIG. 7 schematically illustrates a third variation of a primary structure of the magnetic material 10 according to the present invention. In the third variation, the second magnetic layers 2 may include at least Ni. Thus, not all regions of the second magnetic layers 2 need to be formed only by Ni atoms 2a. For example, as shown in FIG. 7, the (4n±2)th second magnetic layer 2 from the bottom is formed by Ni atoms 2a where n is a positive integer, whereas the 4nth second magnetic layer 2 is formed by atoms 2b. Pt, Pd, or the like may be used as the element of the atoms 2b.

Figure 8:
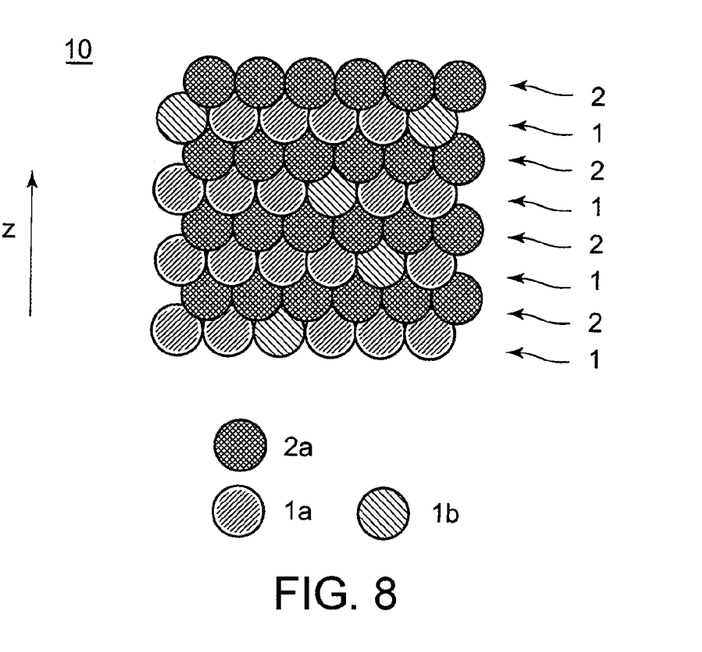
FIG. 8 is a cross-sectional view schematically showing a fourth variation of the primary structure of the magnetic material according to the present invention.
Figure 9:
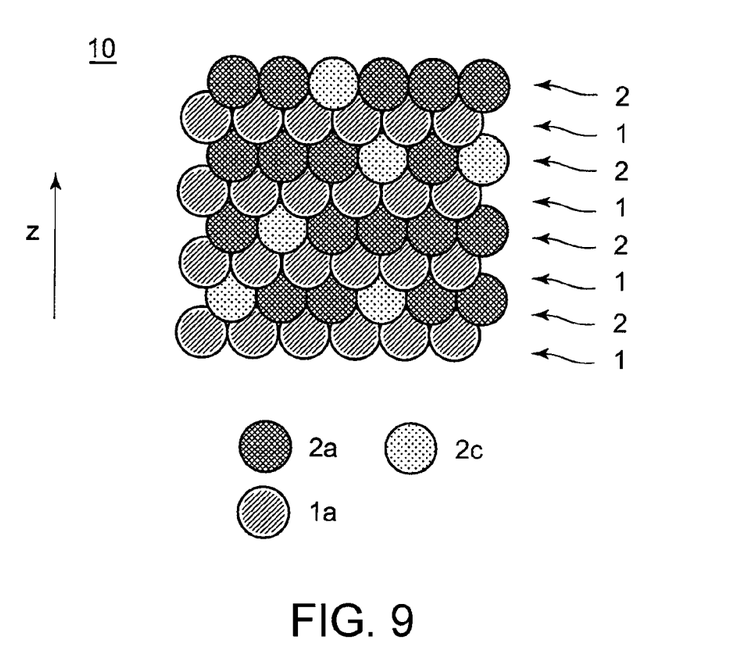
FIG. 9 is a cross-sectional view schematically showing a fifth variation of the primary structure of the magnetic material according to the present invention.

FIGS. 8 and 9 schematically illustrate fourth and fifth variations of a primary structure of the magnetic material 10 according to the present invention. The first magnetic layers 1 contain Co atoms 1a as a principal component. The first magnetic layers 1 may not be formed by Co only. For example, as shown in FIG. 8, the first magnetic layers 1 may include a trace of atoms 1b. Fe or the like may be used as the element of the atoms 1b. Furthermore, as long as the second magnetic layers 2 include Ni, the second magnetic layers 2 may include a trace of atoms 2c as shown in FIG. 9. Pt, Pd, or the like may be used as the element of the atoms 2c.

Figure 10:
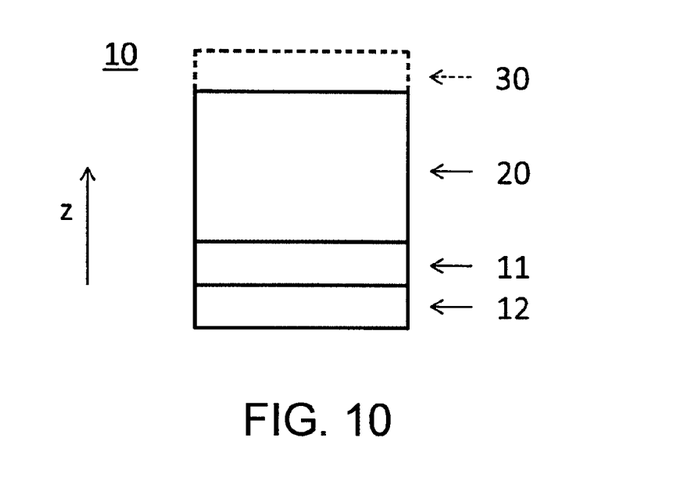
FIG. 10 is a cross-sectional view schematically showing an example of an underlayer arrangement of a magnetic material according to the present invention.

Next, a configuration of an underlayer for facilitating formation of the magnetic material 10 and holding the characteristics with stability will be described. FIG. 10 schematically illustrates a preferred embodiment of a magnetic material 10 including an underlayer according to the present invention. As shown in FIG. 10, it is preferable for the magnetic material 10 to include a first underlayer 11 and a second underlayer 12 closer to a substrate than a layered body 20, in which first magnetic layers and second magnetic layers are alternately stacked. Nevertheless, the magnetic material 10 may include only the first underlayer 11 among those underlayers. As is apparent from FIG. 10, the first underlayer 11 is closer to the layered body 20 than the second underlayer 12. As described as a specific film configuration in connection with FIG. 3B, the inventors have found that use of a Ta/Pt underlayer arrangement enables to obtain high magnetic anisotropy with a film configuration that has not heretofore been known. In this example, Pt corresponds to the first underlayer, and Ta corresponds to the second underlayer. The Ta/Pt film configuration is designed based upon the following technical concept.

First, Ta is deposited on a Si substrate covered with $SiO_2$ or the like by a sputtering method. In this case, if the film thickness of Ta is small, Ta is deposited with an amorphous structure. Next, Pt is deposited on the amorphous Ta. In this case, crystal of Pt grows on a layer-by-layer basis with fcc(111) orientation. The fcc(111) surface has six-fold symmetry within the film plane. Accordingly, when Co and Ni are alternately stacked on this surface, the underlying Pt serves as a template for crystal growth. Thus, a desired crystal structure can be achieved.

Materials that can be used instead of Ta to implement such a mechanism for crystal growth include group 4 elements to group 6 elements such as Ti, V, Cr, Zr, Nb, Mo, Hf, and W. Such materials may be an alloy of those elements or an alloy including those elements as a principal component. Furthermore, materials that can be used instead of Pt may include a material that has a stable fcc or hcp structure. Specific examples of materials that can be used instead of Pt include Cu, Tc, Ru, Rh, Pd, Ag, Re, Os, Ir, Au, and the like, or an alloy of those elements, or an alloy including those elements as a principal component. Similarly, a cap layer 30 of the magnetic material 10, which is formed above the Co/Ni layered structure, is preferably formed of a material having six-fold symmetry. In the above example, Pt is used for the cap layer. However, other materials may be used for the cap layer. Specific examples of materials for the cap layer include the same materials as the examples for the underlayer, which are omitted to avoid redundancy.

Figure 11:
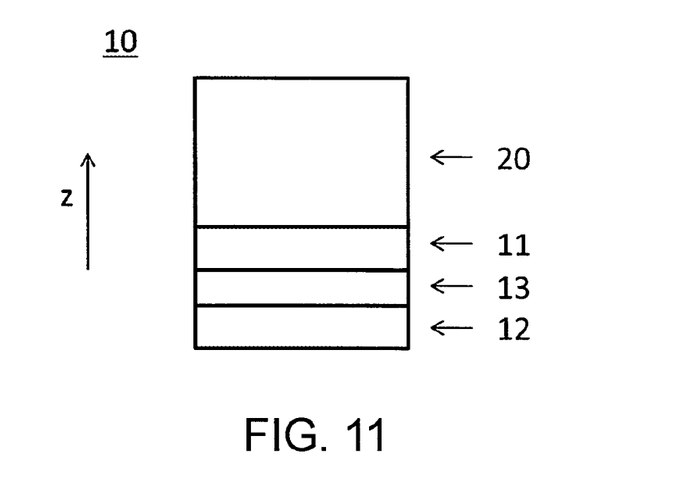
FIG. 11 is a cross-sectional view schematically showing a variation of the underlayer arrangement of the magnetic material according to the present invention.

Furthermore, FIG. 11 illustrates a variation of an underlayer arrangement of the magnetic material 10 according to the present invention. FIG. 10 illustrates a configuration having the first underlayer 11 and the second underlayer 12. As shown in FIG. 11, however, a third underlayer 13 may be provided between the first underlayer 11 and the second underlayer 12. The third underlayer 13 may contain at least one of Ti, V, Cr, Mg, Al, Si, and the like.

The underlayers and the cap layers described above are not essential to implement the magnetic material 10 according to the present invention. Thus, the underlayers and the cap layers may have different configurations. Alternatively, no underlayers or cap layers may be formed.

Manufacturing Method

Next, a method of manufacturing the magnetic material 10 according to the present invention will be described. In the above example, there has been described that the magnetic material 10 can be formed by a sputtering method. Specifically, the first magnetic layers 1 and the second magnetic layers 2 are alternately deposited by a sputtering method to form the magnetic material 10. There can be used methods other than a sputtering method, such as a vacuum deposition method, a molecular beam epitaxy (MBE) method, a laser ablation method, and an ion plating method. When a sputtering method is used, Ar, Kr, Xe, or the like may be used as a sputtering gas. Furthermore, a method of forming a regular layer structure is not limited to alternately depositing the first magnetic layers and the second magnetic layers. The first magnetic layers and the second magnetic layers may simultaneously be deposited to form a regular layer structure during crystal growth. Furthermore, the substrate may be held at a high temperature during the deposition so as to promote crystallization and regularization. Alternatively, an annealing process may be performed after the deposition so as to promote crystallization and regularization. In an alloy phase diagram, Co and Ni are almost complete solid solutions. The structure of the magnetic material 10 according to the present invention in which monoatomic layers are alternately stacked is a metastable structure. There has been reported that a metal alloy material having a metastable structure can be formed by cold rolling or the like. Therefore, the magnetic material according to the present invention can be formed by a processing method such as cold rolling.

Advantageous Effect of Embodiment

A first advantageous effect of the embodiment according to the present invention is facilitation of manufacturing a hard magnetic material having high magnetic anisotropy. Known hard magnetic materials require a high-temperature process for synthesis. The high-temperature process exerts an adverse influence. Furthermore, it is difficult to process those known hard magnetic materials by a reactive ion etching method. In contrast, a magnetic material 10 according to the present invention can be formed at a room temperature. Thus, a magnetic material 10 according to the present invention requires no high-temperature process. Furthermore, a magnetic material 10 according to the present invention can maintain characteristics after heat treatment at a high temperature. Moreover, a magnetic material 10 according to the present invention includes a transition metal such as Co or Ni, which has relatively high reactivity, as a principal component. Therefore, it is easy to process a magnetic material 10 according to the present invention by a reactive ion etching method.

A second advantageous effect of the embodiment according to the present invention is reduction in raw material cost for manufacturing a hard magnetic material having high magnetic anisotropy, continuous supply of raw materials, and the like. A magnetic material 10 according to the present invention includes a transition metal such as Co or Ni as a principal component. Such a transition metal is available at a lower cost as compared to noble metals such as Pt, Pd, and Au and rare-earth metals such as Sm, Nd, Dy, Tb, and Gd. Furthermore, a transition metal such as Co or Ni has overwhelmingly large reserves in the earth. Accordingly, such a transition metal can continuously be supplied over the future.

INDUSTRIAL AVAILABILITY

The industrial availability of the present invention includes a magnetic material used for nonvolatile information storage device. Specific examples include a magnetic random access memory and a storage medium of a hard disk drive. Another example of the industrial availability of the present invention includes a permanent magnet used for a motor of an automobile or the like.

The present invention is not limited to the aforementioned embodiments. It is apparent that the aforementioned embodiments may be modified or changed in an adequate manner within a scope of the technical idea of the present invention.

This application claims the benefit of priority from Japanese patent application No. 2012-273044, filed on Dec. 14, 2012, the disclosure of which is incorporated herein in its entirety by reference.

DESCRIPTION OF REFERENCE NUMERALS AND SIGNS 1 first magnetic layer
2 second magnetic layer
1a Co atom
2a Ni atom
10 magnetic material
11 first underlayer
12 second underlayer
13 third underlayer
20 layered body including first magnetic layers and second magnetic layers
30 cap layer

The invention claimed is:

1. A magnetic material, comprising:
   a plurality of first magnetic layers, each of the plurality of first magnetic layers containing Co, and having a thickness of 0.25 nm; and
   a plurality of second magnetic layers, each of the plurality of second magnetic layers containing Ni, and having a thickness of 0.2 nm, each of the first magnetic layers and each of the second magnetic layers being alternately disposed in a thickness direction perpendicular to a layer surface,
   the magnetic material having magnetic anisotropy in a direction perpendicular to the layer surface.

2. The magnetic material as recited in claim 1, wherein an atomic arrangement within a layer surface of each of the first magnetic layers and the second magnetic layers has substantially six-fold symmetry.

3. The magnetic material as recited in claim 2, further including a first underlayer or a cap layer, the first underlayer or the cap layer containing at least one of Cu, Tc, Ru, Rh, Pd, Ag, Re, Os, Ir, Pt, and Au.

4. The magnetic material as recited in claim 2, further including a second underlayer, the second underlayer containing at least one of Ti, V, Cr, Zr, Nb, Mo, Hf, Ta, and W.

5. The magnetic material as recited in claim 2, further including a third underlayer, the third underlayer containing at least one of Ti, V, Cr, Mg, Al, and Si.

6. The magnetic material as recited in claim 2, wherein each of the first magnetic layers consists essentially of Co, and each of the second magnetic layers consists essentially of Ni.

7. The magnetic material as recited in claim 1, further including a first underlayer or a cap layer, the first underlayer or the cap layer containing at least one of Cu, Tc, Ru, Rh, Pd, Ag, Re, Os, Ir, Pt, and Au.

8. The magnetic material as recited in claim 7, further including a second underlayer, the second underlayer containing at least one of Ti, V, Cr, Zr, Nb, Mo, Hf, Ta, and W.

9. The magnetic material as recited in claim 7, further including a third underlayer, the third underlayer containing at least one of Ti, V, Cr, Mg, Al, and Si.

10. The magnetic material as recited in claim 7, wherein each of the first magnetic layers consists essentially of Co, and each of the second magnetic layers consists essentially of Ni.

11. The magnetic material as recited in claim 1, further including a second underlayer, the second underlayer containing at least one of Ti, V, Cr, Zr, Nb, Mo, Hf, Ta, and W.

12. The magnetic material as recited in claim 11, further including a third underlayer, the third underlayer containing at least one of Ti, V, Cr, Mg, Al, and Si.

13. The magnetic material as recited in claim 11, wherein each of the first magnetic layers consists essentially of Co, and each of the second magnetic layers consists essentially of Ni.second magnetic layer consists essentially of Ni.

14. The magnetic material as recited in claim 1, further including a third underlayer, the third underlayer containing at least one of Ti, V, Cr, Mg, Al, and Si.

15. The magnetic material as recited in claim 14, wherein each of the first magnetic layers consists essentially of Co, and each of the second magnetic layers consists essentially of Ni.

16. The magnetic material as recited in claim 1, wherein each of the first magnetic layers consists essentially of Co, and each of the second magnetic layers consists essentially of Ni.

17. The magnetic material as recited in claim 1, wherein a layered body in which each of the first magnetic layers and the second magnetic layers has a crystal structure of either NiAs type or CuPt type ($L1_1$ type).

18. A method of manufacturing the magnetic material as recited in claim 1, the method comprising:
forming the first magnetic layers and the second magnetic layers by deposition with one of a sputtering method, a vacuum deposition method, a molecular beam epitaxy method, a laser ablation method, and an ion plating method.

19. The method of manufacturing the magnetic material as recited in claim 18, wherein the magnetic material is formed by alternately depositing the first magnetic layers and the second magnetic layers.

20. The magnetic material according to claim 1, wherein magnetic anisotropy of the magnetic martial is higher than magnetic anisotropy of an other magnetic material, the other magnetic material having a plurality of Co layers, and a plurality of Ni layers alternately disposed in a thickness direction, each of the Co layers of the other magnetic material having a thickness of 0.25 nm, each of the Ni layers of the other magnetic material having a thickness equal to or greater than twice the thickness of each of the Co layers of the other magnetic material.

21. A magnetic material, comprising:
a plurality of first magnetic layers, each of the plurality of first magnetic layers containing Co, and having a thickness of 0.25 nm; and
a plurality of second magnetic layers, each of the plurality of second magnetic layers containing Ni, and having a thickness in a range of 0.16 nm to 0.225 nm, each of the first magnetic layers and each of the second magnetic layers being alternately disposed in a thickness direction perpendicular to a layer surface,
the magnetic material having magnetic anisotropy in a direction perpendicular to the layer surface.

\* \* \* \* \*